United States Patent
Kimura et al.

(10) Patent No.: US 6,781,349 B2
(45) Date of Patent: Aug. 24, 2004

(54) BATTERY POWER SOURCE DEVICE

(75) Inventors: Kenji Kimura, Sennan-gun (JP); Seiichi Uemoto, Izumi (JP); Takabumi Fujii, Suita (JP)

(73) Assignee: Matsushita Battery Industrial Co., Ltd., Osaka (JP)

( * ) Notice: Subject to any disclaimer, the term of this patent is extended or adjusted under 35 U.S.C. 154(b) by 0 days.

(21) Appl. No.: 10/262,100

(22) Filed: Sep. 30, 2002

(65) Prior Publication Data

US 2004/0061480 A1 Apr. 1, 2004

(51) Int. Cl.[7] ................................................. H02J 7/04
(52) U.S. Cl. ...................................... 320/150; 320/112
(58) Field of Search ................................. 320/150, 112, 320/116, 132, 149, 153, 161, 162; 429/61, 62; 160/65.1; 180/65.3, 65.5, 65.1

(56) References Cited

U.S. PATENT DOCUMENTS 5,215,834 A * 6/1993 Reher et al. .................. 429/62
5,624,003 A * 4/1997 Matsuki et al. ............. 180/65.1
6,407,533 B1 * 6/2002 Bartek et al. ................ 320/150
6,411,063 B1 * 6/2002 Kouzu et al. ................ 320/150

FOREIGN PATENT DOCUMENTS

JP          06-231807          8/1994

* cited by examiner

Primary Examiner—Lawrence Luk
(74) Attorney, Agent, or Firm—Jordan and Hamburg LLP

(57) ABSTRACT

A battery power source device is provided for supplying high electric power used for a drive power source for a vehicle. The battery power source device includes a battery box for storing a plurality of batteries arranged in a connected state in a battery storage room, an inlet opening for introducing a temperature control medium into the battery storage room, an outlet opening for discharging the medium from the battery storage room to the outside, a medium circulation passage for leading the medium discharged from the outlet opening to the inlet opening for feeding into the battery storage room again, and a medium transport device for forcing the medium flow.

41 Claims, 3 Drawing Sheets

BATTERY POWER SOURCE DEVICE

BACKGROUND OF THE INVENTION

1. Field of the Invention

The present invention relates to a battery power source device for supplying high electric power used for a drive power source for a vehicle.

2. Description of Related Art

Generally, the output of a rechargeable battery is from about 1 to 5 volts. When a high output voltage is necessary for an application such as a power source for the drive of a vehicle, a battery power source device which consists of a large number of rechargeable batteries 1 is required. These rechargeable batteries 1 are connected in series, and arranged in both lengthwise and widthwise directions within a battery box 2, as shown in a schematic longitudinal sectional view of FIG. 3. In this battery power source device, charge and discharge control is conducted so as to maintain the battery power source device in a state always capable of supplying a required level of electric power.

Since the temperature of the rechargeable battery 1 increases when it is charged and discharged, it is necessary for a battery power source device to provide cooling to limit such temperature increases. On the other hand, since temperature dependence of the internal resistance of the rechargeable battery 1 becomes very large when the rechargeable battery 1 is used in a place at low temperatures, differences in individual battery characteristics among the rechargeable batteries 1 become large if as much differences in temperature as they are at an ordinary temperature are present among the rechargeable batteries 1. As a consequence, overall control of the rechargeable batteries 1 is often prevented Thus, it becomes new to quickly increase the temperatures of the individual rechargeable batteries 1 to a temperature where any decrease of battery performance no longer remains a problem. Additionally, the temperatures of the rechargeable batteries 1 should be maintained at a uniform level when such a battery power source device, including a large number of the rechargeable batteries 1, is used at low temperatures. In addition, the dependency of the battery characteristics of each rechargeable battery 1 on temperature makes it necessary to maintain the temperatures of the entire arrangement of rechargeable batteries 1 at a uniform level.

Thus, controlling the temperatures of the individual rechargeable batteries 1 in a conventional battery power source device consists of adopting an arrangement for cooling the individual rechargeable batteries 1 by opening one end of the battery box 2 to form an air inlet opening 3, providing an air outlet passage 4 on the other end, and providing a fan 7 inside the air outlet passage 4 which is driven to blow air in one direction through the battery box 2, thereby forcing air E to flow between the individual rechargeable batteries 1. In addition, when the rechargeable batteries 1 are used at a low temperature, it is known to use a battery heater, such as a combustion heater or an electrical heater, installed on the battery box 2 so as to maintain the individual rechargeable batteries 1 at a predetermined temperature (such as one disclosed in Japanese Patent Laid-Open Publication No. Hei. 6-231807).

However, a problem with the temperature control described above is that, air E, having flowed from the air inlet opening 3, flows downstream while absorbing heat from the rechargeable batteries 1 when it passes between the rechargeable batteries 1, the temperature of the air E increases as it flows downstream. Thus, while the rechargeable batteries 1 on the side of the air inlet opening 3 are efficiently cooled by exchanging heat with the air E at a low temperature, the rechargeable batteries 1 on the side of the air outlet passage 4 are hardly cooled since they are exposed to the air E heated as a result of the heat exchange with the rechargeable batteries 1 on the upstream side. Consequently, the individual rechargeable batteries 1 are not uniformly cooled. As a result, there is such a problem that a large temperature difference is present between the rechargeable batteries 1 on the side of the air inlet opening 3 and the rechargeable batteries 1 on the side of the air outlet passage 4.

On the other hand, when the battery power source device is used at a low temperature, and the heater is installed to heat the rechargeable batteries 1 as described above, an independent cooler is necessary for use of the device at ordinary temperatures. Thus the structure becomes complicated, and as a consequence, the cost increases. As an alternative means for increasing the temperature of the rechargeable batteries without a heater, the rechargeable batteries are placed in a battery box in which a medium such as air does not flow, and the heat from the rechargeable batteries generated by charging and discharging is used to increase the temperature of the rechargeable batteries. However, in this method, since the heat generation varies among the individual rechargeable batteries due to variation in the internal resistance or the temperature characteristics among the rechargeable batteries or the heat dissipation varies among the rechargeable batteries due to the placement of the rechargeable batteries within the battery box, it is not possible to maintain the temperatures of the entire arrangement of rechargeable batteries at a uniform level.

SUMMARY OF THE INVENTION

The present invention has been devised in light of the above-described problems, and has an object of providing a battery power source device having a simple and inexpensive constitution which serves to cool batteries if the temperature is at ordinary temperatures, and quickly increase the battery temperature to a temperature range which does not decrease the battery performance while the temperatures of the individual batteries are maintained uniform if the temperature is low during use.

To achieve the object above, a battery power source device according to the present invention includes a battery box for storing a plurality of batteries arranged in a connected state in a battery storage room, an inlet opening for introducing a temperature control medium into the battery storage room, an outlet opening for discharging the medium from the battery storage room to the outside, a medium circulation passage for leading the medium discharged from the outlet opening to the inlet opening for feeding into the battery storage room again, and a medium transport device for forcing the medium flow.

If this battery power source device is used at low temperatures, since the temperature control medium, such as air, is introduced into the battery storage room again through the medium circulation passage for circulation after the medium has passed through the battery storage room, and consequently the temperature of the medium has increased due to heat exchange with the individual batteries, it is possible to quickly increase the temperatures of the individual batteries while the temperatures are maintained at a uniform level. In addition, if the battery power source device is used at ordinary temperatures, the individual batteries are cooled efficiently, and thus a proper temperature control effect is provided by discharging the temperature control medium outside from the outlet opening after the medium has flowed from the inlet opening and has passed through the battery storage room. Thus, though this battery power source device has a simple constitution which includes only the medium circulation passage without a heater or a cooler, it prevents a variation in the temperature characteristics of the individual batteries due to temperature unevenness of the batteries both at low temperatures and at ordinary temperatures. As a result, overall performance brought about by the entirety of batteries is maintained to a proper state.

It is preferable that the battery power source device further includes a selector valve mechanism for switching so as to selectively lead the temperature control medium discharged from the outlet opening either to an external outlet passage or the medium circulation passage, and a controller for controlling to switch the selector valve mechanism.

In the constitution described above, it is preferable that the controller includes a function for controlling switching of the medium transport device so as to reverse the flow direction of the medium in the battery power source device. It is preferable that the battery power source device further includes a temperature sensor for detecting the temperature of a battery in the battery storage room, or the temperature of the temperature control medium at a predetermined point in the battery storage room, and that the controller controls switching of the medium transport device in accordance with the temperature detected by the temperature sensor.

It is preferred that the battery power source device further includes another selector valve mechanism for switching so as to selectively a either the temperature control medium introduced from an inlet passages or the temperature control medium introduced from the medium circulation passage into the battery storage room, and that the controller control switching of the two selector valve mechanisms in conjunction with each other.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
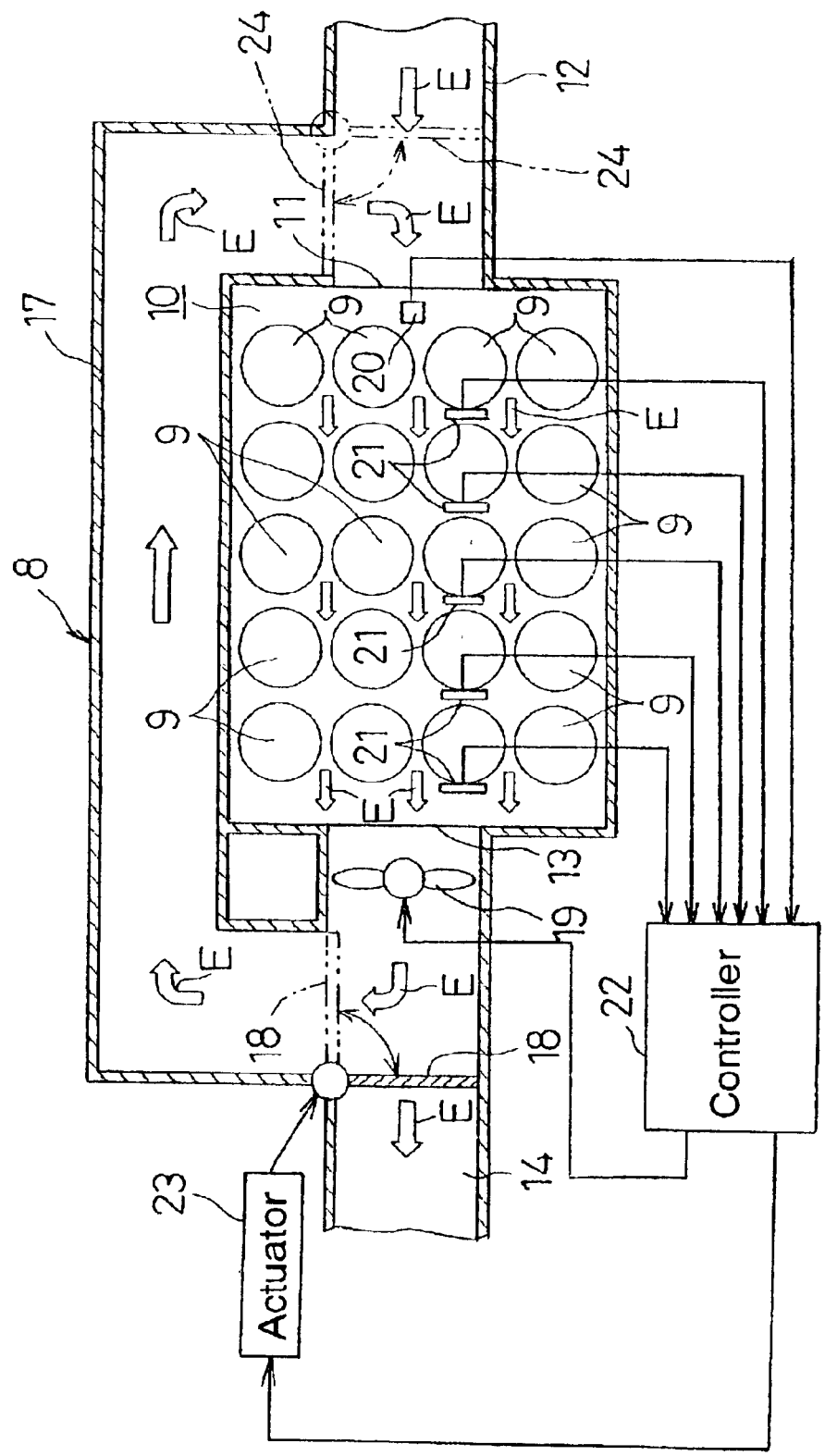
FIG. 1 is a schematic longitudinal sectional view showing a battery power source device according to one embodiment of the present invention.

The following will describe a preferred embodiment of the present invention with reference to the drawings. FIG. 1 is a schematic longitudinal sectional view showing a battery power source device according to one embodiment of the invention. In the drawing, a required number of rechargeable batteries 9 for supplying a necessary output voltage are stored in a battery storage room 10 of a battery box 8, which is in a rectangular solid shape. The rechargeable batteries 9 are arranged in both lengthwise and widthwise directions, and are electrically connected. In the present embodiment, the rechargeable batteries 9 are placed such that each battery row includes the four rechargeable batteries 9 along a line orthogonal to a flow direction of air E, and the five battery rows exist along the flow direction.

An inlet duct 12 is connected with an inlet opening 11, and simultaneously, an outlet duct 14 is connected with an outlet opening 13 in the battery storage room 10. A circulation duct 17 is provided for communicating an entrance of the outlet duct 14 and an exit of the inlet duct 12 to each other. A selector valve member 18 for switching the flow of the air E between the outlet duct 14 and the circulation duct 17 is provided so as to move between the individual entrances of the outlet duct 14 and the circulation duct 17. A fan 19 for forcing the air E flow is provided between the outlet opening 13 and the individual entrances of the outlet duct 14 and the circulation duct 17.

A temperature sensor 20 for detecting the temperature of the air E is provided at the inlet opening 11 of the battery box 8. Temperature sensors 21 for respectively detecting the temperatures of the individual rechargeable batteries 9 in the five battery rows arranged along the flow direction are provided in contact with the rechargeable batteries 9. These temperature sensors 20 and 21 are contact type sensors, such as thermistors, which detect a temperature based on a change of the resistance. A controller 22 controls switching of the rotation direction of the fan 19, and simultaneously controls switching of the selector valve member 18 through an actuator 23 in accordance with temperature detection signals supplied from the individual temperature sensors 20 and 21.

The following will describe the operation of the battery power source device of the present embodiment. First, when the battery power source device is used at low temperatures, the controller 22 controls the actuator 23 to set the selector valve member 18 to a position indicated by solid lines. As a result, the outlet opening 13 of the battery storage room 10 is shut off from the outlet duct 14, and communicates to the circulation duct 17. In this state, the fan 19 is rotated in the forward direction by the controller 22. Thereby, the air E is sucked from the inlet duct 12 into the battery storage room 10 through the inlet opening 11, flows through the battery storage room 10, flows out from the outlet opening 13, passes through the circulation duct 17, and then flows into the battery storage room 10 again from the inlet opening 11. In this way, the air E circulates.

This flowing air E absorbs heat from the rechargeable batteries 9 while it is flowing through the battery storage room 10, and is discharged from the outlet opening 13 while its temperature is increased. Then, the air E flows into the battery storage room 10 again from the inlet opening 11 after passing through the circulation duct 17. The temperature of the air E gradually increases as it repeats this circulation. Thus, the temperatures of the individual rechargeable batteries 9 quickly increase while these temperatures are maintained at a uniform level by the air E whose temperature increases gradually as it circulates.

The controller 22 always monitors the temperatures of the individual rechargeable batteries 9 in the five rows based on the temperature detection signals supplied from the temperature sensors 21. When the controller 22 determines that a difference in temperature between the rechargeable battery 9 at the inlet opening 11 and the rechargeable battery 9 at the outlet opening 13 reaches a predetermined value 3° C. for example the controller 22 switches the rotation of the fan 19 from the forward direction to the reverse direction. As a result, since the fan 19 operates so as to blow the air E after passing through the circulation duct 17 into the battery storage room 10 from the outlet opening 13, the air E circulates along the circulation route the same as that for the forward rotation of the fan 19 but in the opposite direction. Consequently, the phenomenon that the temperature at the outlet opening 13 is higher than the temperature at the inlet opening 11 among the rechargeable batteries 9 is avoided, and thus the uniformity of the temperature among the rechargeable batteries 9 increases. On the other hand, when the battery power source device is used at ordinary temperatures, the controller 22 controls the actuator 23 to set the selector valve member 18 to a position indicated by a dash-double-dot line. As a result, the outlet opening 13 is shut off from the circulation duct 17, and communicates to the outlet duct 14. In this state, the fan 19 is rotated in the forward direction by the controller 22. As a result, the air E is sucked from the inlet duct 12 into the battery box 8 through the inlet opening 11, flows through the battery storage room 10, flows out from the outlet opening 13, and then is discharged outside from the outlet duct 14. Thereby, the cold air E always flows from the inlet duct 12 into the battery storage room 10. This flowing air E absorbs the heat from the rechargeable batteries 9 so as to cool the rechargeable batteries 9 while it is passing through the battery storage room 10, and is discharged outside from the outlet opening 13 through the outlet duct 14 while its temperature is increased. Thus, the individual rechageable batteries 9 are always cooled efficiently by the cold air E while their temperatures are maintained at a uniform level.

The controller 22 always monitors the temperatures of the individual rechargeable batteries 9 in the five rows based on the temperature detection signals supplied from the temperature sensors 21. Simultaneously, the controller 22 monitors the temperature of the air E flowing from the inlet duct 12 based on the detection signal supplied from the temperature sensor 20. When the controller 22 determines that it is necessary to further equalize the temperatures of the individual rechargeable batteries 9, the controller 22 switches the rotation of the fan 19 from the forward direction to the reverse direction. As a rest, since the fan 19 operates so as to blow the air E sucked from the outlet duct 14 into the battery storage room 10 from the outlet opening 13, the air E flows along the flow route the same as that for the forward rotation of the fan 19 but in the opposite direction. Consequently, the phenomenon that the temperature at the outlet opening 13 is lower than the temperature at the inlet opening 11 among the rechargeable batteries 9 is avoided, and thus the uniformity of the temperature among the rechargeable batteries 9 increases.

As described above, the battery power source device uses a simple constitution where a special heater or a cooler is not used, the circulation duct 17 is provided so as to communicate the battery storage room 10 to each other, and the rotation direction of the fan 19 is switched according to the temperature difference between the parts of the rechargeable batteries 9, or the temperature of the air E. With this constitution, the battery power source device heats or cools a large number of the rechargeable batteries 9 in the battery storage room 10 while the temperatures of the rechargeable batteries 9 are maintained at a uniform level whether the battery power source device is used at low or ordinary temperatures. Thus, the battery power source device prevents the variation of the battery characteristics caused by the change in battery temperatures.

Figure 2:
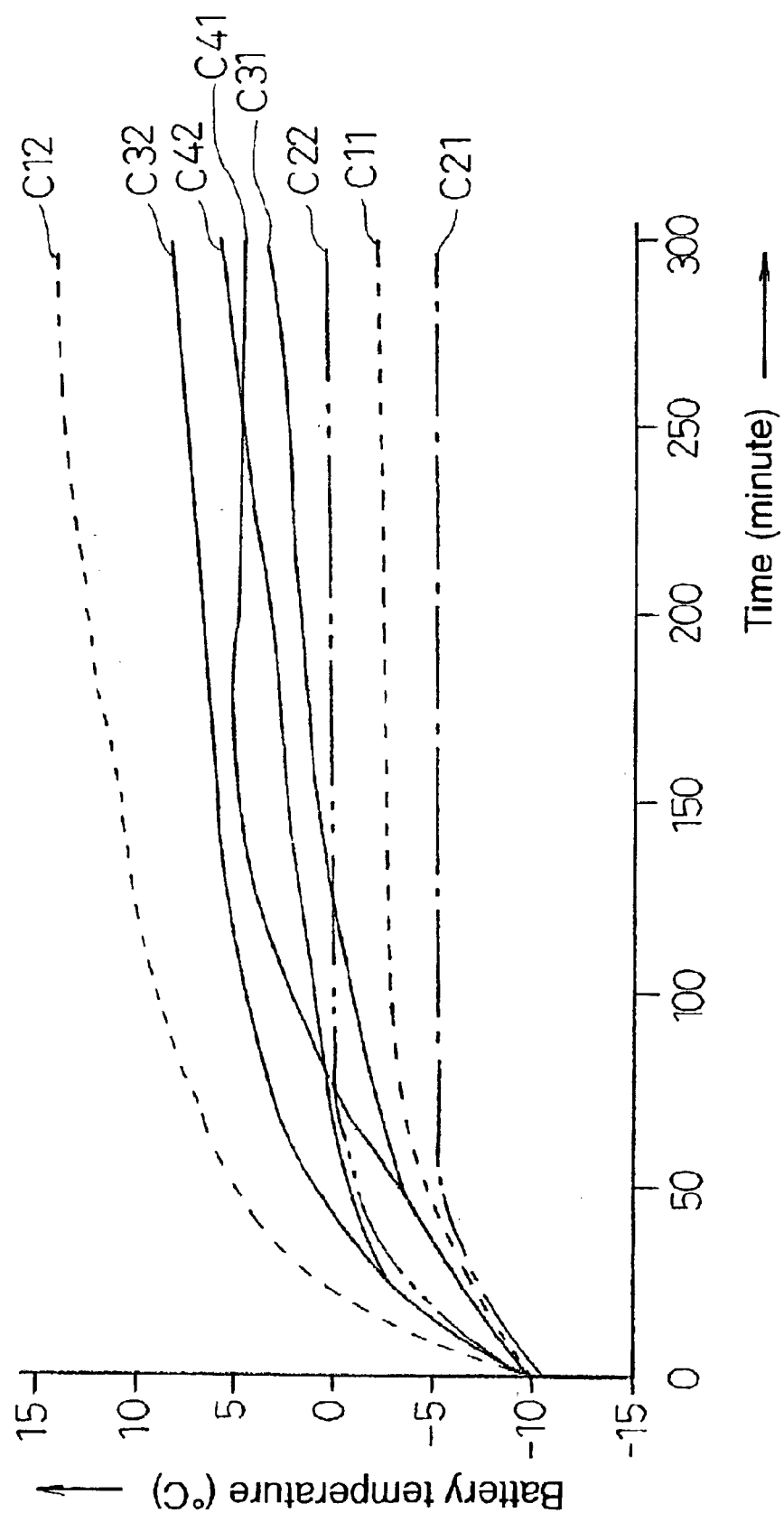
FIG. 2 is a characteristic chart show a relationship between time of the battery operation and a battery temperature while conditions are changed when the battery power source device of the invention, and a battery power source device of comparative example are used at low temperatures.
Figure 3:
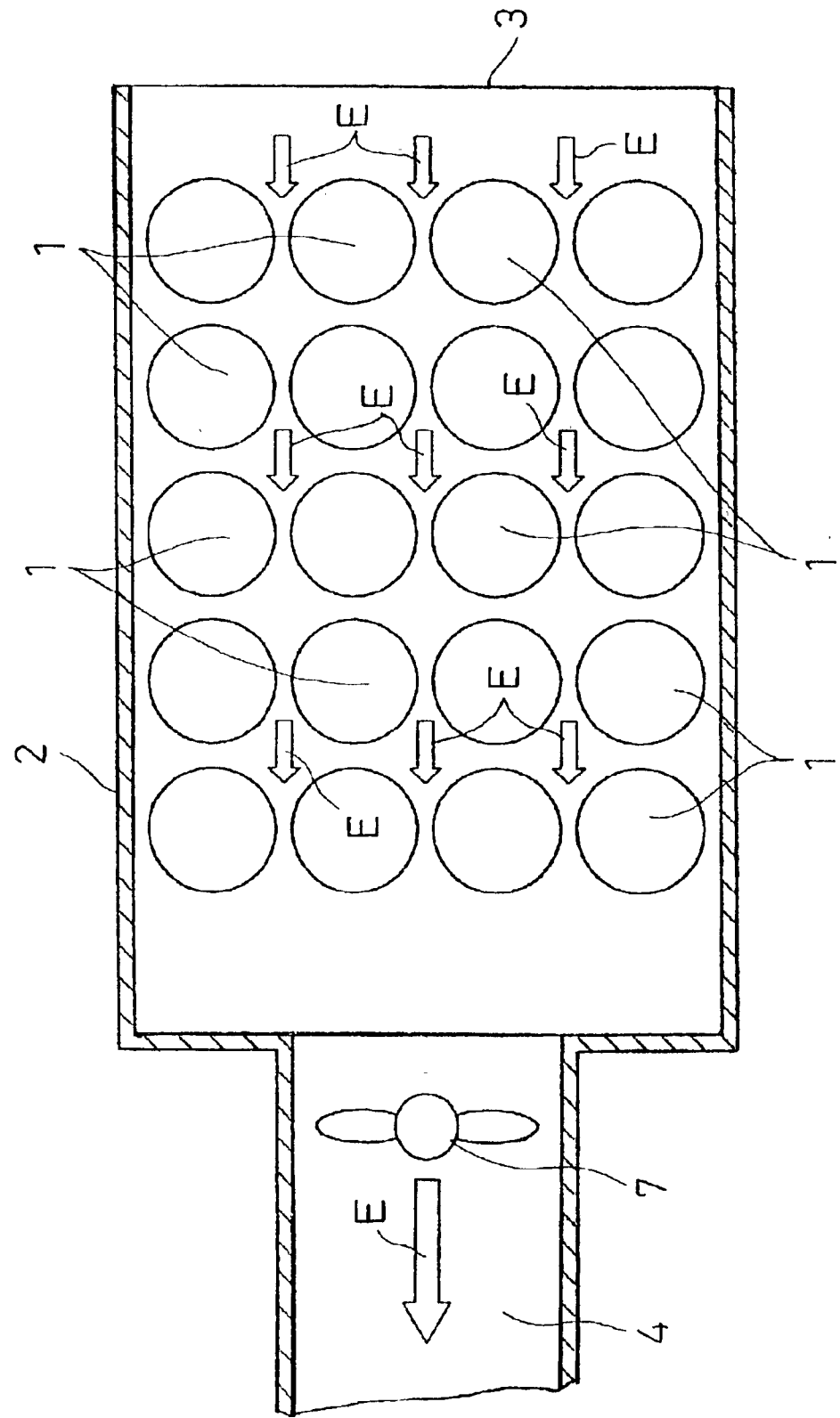
FIG. 3 is a schematic longitudinal sectional view showing a conventional battery power source device.

FIG. 2 is a characteristic chart showing temperature changes of the rechargeable batteries 9 while conditions such as the flow direction of the air E are changed when the battery power source device is used at low temperatures This drawing shows results of the temperature changes of the rechargeable batteries 9 for four types of the flow of the air E. Namely, the fan 19 is maintained stationary as a first condition, the fan 19 rotates in the forward direction while the communication between the outlet opening 13 and the circulation duct 17 is shut off by the selector valve member 18 as a second condition, the fan 19 rotates in the forward direction while the communication between the outlet opening 13 and the outlet duct 14 is shut off by the selector valve member 18 as a third condition, and the fan 19 rotates in the forward direction while the communication between the outlet opening 13 and the outlet duct 14 is shut off by the selector valve member 18, and the rotation direction of the fan 19 is switched when the difference in temperature between the rechargeable batteries 9 on the side of the inlet opening 11, and the rechargeable batteries 9 on the side of the outlet opening 13 is 3° C. or more as a fourth condition. Therefore, the first and second conditions are similar to those for the conventional battery power source device, and the third and fourth conditions are those for he battery power source device of the embodiment described above.

Characteristic curves C11 and C12 in FIG. 2 respectively show temperature changes of the rechargeable batteries 9 in the battery row at the inlet opening 11 and in the battery row at the center under the first condition. In this case, since the fan 19 is maintained stationary, and thus there are large variations in heat generation and heat dissipation of the rechargeable battery 9, the temperature of the rechargeable battery 9 in the battery row at the center becomes the highest as the characteristic curve C12 shows. Namely, there exist the batteries whose temperatures increase very rapidly and the batteries whose temperatures increase very slowly under the first condition. As a result, the uniformity of the battery temperatures becomes very low, and thus a large difference in temperature is generated.

Characteristic curves C21 and C22 respectively show temperature changes of the rechargeable batteries 9 in the battery row at the inlet opening 11 and in the battery row at the outlet opening 13 under the second condition. Under the second condition where the air E flows only in one direction, it was turned out that though the uniformity of the battery temperatures is almost excellent, it is impossible to quickly increase the battery temperature to a high temperature.

Characteristic curves C31 and C32 respectively show temperature changes of the rechargeable batteries 9 in the battery row at the inlet opening 11 and in the battery row at the outlet opening 13 under the third condition. Characteristic curves C41 and C42 respectively show temperature changes of the rechargeable batteries 9 in the battery row at the inlet opening 11 and in the battery row at the outlet opening 13 under the fourth condition. Under the third and fourth conditions which circulate the air E as in the battery power source device of the embodiment described above, it was turned out that the battery temperatures increase quickly while the uniformity of the battery temperatures is maintained. Further, under the fourth condition which switches the flow direction of the air E when the difference in temperature between the rechargeable batteries 9 reaches the predetermined value in addition to circulating the air E, the uniformity of the battery temperatures increases further.

As the dash-double-dot line in FIG. 1 shows, it is more preferable to provide a selector valve member 24 for switching so as to selectively communicate either the inlet duct 12 or the circulation duct 17 to the inlet opening 11, and to switch this selector valve member 24 in association with the selector valve member 18. Namely, both of the selector valve members 18 and 24 are controlled by the controller 22 so as to selectively switch between a sate where the entrance and the exit of the circulation duct 17 are closed simultaneously, and a state where the outlet duct 14 and the inlet duct 12 are closed simultaneously. As a result, since the air E is circulated while the introduction of cold air from the inlet duct 12 is prevented when the battery power source device is used at low temperatures, the temperatures of the rechargeable batteries 9 increase quickly. On the other hand, since the entire air E from the inlet duct 12 are prevented from flowing into the circulation duct 17, and thus efficiently flows into the battery storage room 10 when the battery power source device is used at ordinary temperatures, the rechargeable batteries 9 are efficiently cooled.

While the embodiment above is described for the case where the cylindrical rehargeable batteries 9 are used, it is apparent that a similar effect is achieved when primary batteries or rechargeable batteries in another shape such as a prismatic shape are used. Also, air E is used as the temperature control medium, and simultaneously the fan 19 is used as the medium transport device in the embodiment, it is possible to properly select another temperature control medium or another medium transport device.

The battery power source device of the preset invention has such a constitution that the temperature control medium passes through the battery storage room while the temperature thereof increases by the heat exchange with the batteries and is introduced into the battery storage room again through the medium circulation passage so as to circulate. Thus, it is possible to increase the temperatures of the individual batteries while the temperatures are maintained at a uniform level, when the battery power source device is used at low temperatures. On the other hand, the individual batteries are efficiently cooled by discharging the temperature control medium outside from the outlet opening after the temperature control medium has flowed from the inlet opening, and then has passed through the battery storage room. Thus, excellent temperature control effect is achieved when the battery power source device is used at ordinary temperatures. Consequently, though this battery power source device has the inexpensive constitution which simply includes the medium circulation path, the battery power source device prevents the variation of the temperature characteristics of the individual batteries due to unevenness of the individual battery temperature whether the battery power source device is used at low temperatures or at ordinary temperatures, thereby maintaining excellent overall performance of the entire batteries.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery power source device comprising:
   a battery box having a battery storage room storing a plurality of batteries arranged in a connected state, and an external outlet passage for temperature control medium;
   the battery storage room having an inlet opening for introducing the temperature control medium into said battery storage room from outside of said battery storage room;
   an outlet opening for discharging said medium from said battery storage room to the outside;
   a medium circulation passage for leading said medium discharged from the battery storage room through said outlet opening to said inlet opening to feed into said battery storage room, said medium circulation passage being substantially absent thermal exchange devices and thermal input other than heat generated by said plurality of batteries;
   a medium transport device for forcing said medium to flow;
   a selector valve mechanism switching a path of the temperature control medium discharged from the outlet opening either to the external outlet passage or the medium circulation passage; and
   a controller controlling the selector valve mechanism.

2. The battery power source device according to claim 1, wherein the controller includes a function for controlling to switch the medium transport device so as to reverse the flow direction of the medium.

3. The battery power source device according to claim 2, further comprising a temperature sensor for detecting a temperature of a predetermined battery in the battery storage room, or a temperature of the medium at a predetermined point in the battery storage room, wherein
   the controller controls to switch the medium transport device in accordance with the temperature detected by said temperature sensor.

4. A battery power source device, comprising:
   a battery box having a battery storage room storing a plurality of batteries arranged in a connected state, and an external outlet passage for temperature control medium;
   the battery storage room having an inlet opening for introducing the temperature control medium into said battery storage room from outside of said battery storage room;
   an outlet opening for discharging said medium from said battery storage room to the outside;
   a medium circulation passage for leading said medium discharged from the battery storage room through said outlet opening to said inlet opening to feed into said battery storage room, said medium circulation passage being substantially absent thermal exchange devices and thermal input other than heat generated by said plurality of batteries;
   a medium transport device for forcing said medium to flow;
   a selector valve mechanism switching a path of the temperature control medium discharged from the outlet opening either to the external outlet passage or the medium circulation passage;
   a controller controlling the selector valve mechanism;
   said battery box having an external inlet passage; and
   another selector valve mechanism for switching so as to selectively lead either the temperature control medium introduced from the external inlet passage, or the medium introduced from the medium circulation passage into the battery storage room, wherein
   the controller controls to switch the two selector valve mechanisms in conjunction with each other.

5. A battery power source device, comprising:
   a housing having a battery storage compartment storing batteries;

said battery storage compartment defining a first port and a second port for accepting and discharging a heat transfer medium into and out of said battery storage compartment, at least a first battery of said batteries being closer to said first port than said second port, and at least a second battery of said batteries being closer to said second port than said first port;

first and second temperature sensors respectively associated with said first and second batteries;

a medium transport device bi-directionally transporting said heat transfer medium in a first direction from said first port to said second port and a second direction from said second port to said first port; and a controller receiving input from said first and second temperature sensors and controlling said medium transport device to selectively transport said heat transfer medium in one of said first and second directions based on a temperature differential between respective temperatures measured by said first and second temperature sensors.

6. A battery power source device, comprising:

a housing having a battery storage compartment storing batteries;

said battery storage compartment defining a first port and a second port for accepting and discharging a heat transfer medium into and out of said battery storage compartment, at least a first battery of said batteries being closer to said first port than said second port, and at least a second battery of said batteries being closer to said second port than said first port;

first and second temperature sensors respectively associated with said first and second batteries;

a medium transport device bi-directionally transporting said heat transfer medium in a first direction from said first port to said second port and a second direction from said second port to said first port;

a controller receiving input from said first and second temperature sensors and controlling said medium transport device to selectively transport said heat transfer medium in one of said first and second directions based on a temperature differential between respective temperatures measured by said first and second temperature sensors;

a re-circulation duct for directing said heat transfer medium between said first and second ports to distribute heat produced by said batteries amongst said batteries; and said controller switching between said first and second directions when said temperature differential exceeds a predetermined limit to effect uniform heating of said batteries by redirecting flow of said heat transfer medium to said first port when said first temperature sensor measures a higher temperature than said second temperature sensor, and to said second port when said second temperature sensor measures a higher temperature than said first temperature sensor.

7. The battery power source device of claim 6, wherein said re-circulation duct is substantially devoid of thermal exchange devices.

8. The battery power source device of claim 7, further comprising:

a third port for accepting and discharging said heat transfer medium, a third port valve disposable in a first position connecting said first port with said third port and a second position connecting said first port with said re-circulation duct; and said controller controlling said third port valve based on output from said first and second temperature sensors.

9. The battery power source device of claim 8, wherein said controller detects a temperature measured by one of said first and second temperature sensors is below a predetermined level and, in response thereto, sets said third port valve in said second position thereby directing said heat transfer medium from said second port to said first port via said re-circulation duct, and sets said medium transport device to transport said heat transfer medium from said first port to said second port.

10. The battery power source device of claim 9 further comprising:

a fourth port for accepting and discharging said heat transfer medium;

a fourth port valve disposable in a first position connecting said second port with said fourth port and a second position connecting said second port with said re-circulation duct; and said controller setting said fourth port valve in said second position thereby directing said heat transfer medium from said second port to said first port via said re-circulation duct in response to detecting the temperature measured by one of said first and second temperature sensors is below said predetermined level.

11. The battery power source device of claim 10, wherein said controller detects a temperature measured by one of said first and second temperature sensors is above a predetermined level and, in response thereto, sets said third port valve in said first position and sets said fourth port valve in said first position.

12. The battery power source device of claim 11, wherein said housing defines said re-circulation duct.

13. The battery power source device of claim 12, wherein said housing defines said third and fourth ports.

14. The battery power source device of claim 11, wherein said housing defines said third and fourth ports.

15. The battery power source device of claim 10, wherein said housing defines said re-circulation duct.

16. The battery power source device of claim 15, wherein said housing defines said third and fourth ports.

17. The battery power source device of claim 10, wherein said housing defines said third and fourth ports.

18. The battery power source device of claim 9, wherein said housing defines said re-circulation duct.

19. The battery power source device of claim 18, wherein said housing defines said third port.

20. The battery power source device of claim 9, wherein said housing defines said third port.

21. The battery power source device of claim 8, wherein said housing defines said re-circulation duct.

22. The battery power source device of claim 21, wherein said housing defines said third port.

23. The battery power source device of claim 8, wherein said housing defines said third port.

24. The battery power source device of claim 7, wherein said housing defines said re-circulation duct.

25. The battery power source device of claim 6, wherein said housing defines said re-circulation duct.

26. The battery power source device of claim 6, further comprising:

a third port for accepting and discharging said heat transfer medium;

a third port valve disposable in a first position connecting said first port with said third port and a second position connecting said first port with said re-circulation duct; and said controller controlling said third port valve based on output from said first and second temperature sensors.

27. The battery power source device of claim 26, wherein said controller detects a temperature measured by one of said first and second temperature sensors is below a predetermined level and, in response thereto, sets said third port valve in said second position thereby directing said heat transfer medium from said second port to said first port via said re-circulation duct, and sets said medium transport device to transport said heat transfer medium from said first port to said second port.

28. The battery power source device of claim 27 further comprising:

a fourth port for accepting and discharging said heat transfer medium;

a fourth port valve disposable in a first position connecting said second port with said fourth port and a second position connecting said second port with said re-circulation duct; and said controller setting said fourth port valve in said second position thereby directing said heat transfer medium from said second port to said first port via said re-circulation duct in response to detecting the temperature measured by one of said first and second temperature sensors is below said predetermined level.

29. The battery power source device of claim 28, wherein said controller detects a temperature measured by one of said first and second temperature sensors is above a predetermined level and, in response thereto, sets said third port valve in said first position and sets said fourth port valve in said first position.

30. The battery power source device of claim 29, wherein said housing defines said re-circulation duct.

31. The battery power source device of claim 30, wherein said housing defines said third and fourth ports.

32. The battery power source device of claim 29, wherein said housing defines said third and fourth ports.

33. The battery power source device of claim 28, wherein said housing defines said re-circulation duct.

34. The battery power source device of claim 33, wherein said housing defines said third and fourth ports.

35. The battery power source device of claim 28, wherein said housing defines said third and fourth ports.

36. The battery power source device of claim 27, wherein said housing defines said re-circulation duct.

37. The battery power source device of claim 36, wherein said housing defines said third port.

38. The battery power source device of claim 27, wherein said housing defines said third port.

39. The battery power source device of claim 26, wherein said housing defines said re-circulation duct.

40. The battery power source device of claim 39, wherein said housing defines said third port.

41. The battery power source device of claim 26, wherein said housing defines said third port.

* * * * *